US006807149B1

(12) United States Patent
Alexander, Jr. et al.

(10) Patent No.: US 6,807,149 B1
(45) Date of Patent: Oct. 19, 2004

(54) METHOD AND SYSTEM FOR LEC RESILIENCY WITH FAST FAILOVER

(75) Inventors: Cedell Adam Alexander, Jr., Durham, NC (US); Keith Edward Karlsson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 09/617,614

(22) Filed: Jul. 17, 2000

(51) Int. Cl.[7] .............................................. H04L 1/00
(52) U.S. Cl. .................... 370/218; 370/221; 370/225; 370/395.53; 370/401; 370/463; 370/465
(58) Field of Search ............................. 370/395.1, 396, 370/395.5, 395.2, 395.3, 395.4, 400, 401, 419, 421, 463, 465, 466, 216–228; 709/203, 220, 221, 222

(56) References Cited

U.S. PATENT DOCUMENTS

| | | | |
|---|---|---|---|
| 5,412,376 A | | 5/1995 | Chujo et al. ........... 340/825.01 |
| 5,426,773 A | | 6/1995 | Chabanet et al. ........... 395/575 |
| 5,671,215 A | | 9/1997 | Foglar ........................ 370/227 |
| 5,781,528 A | | 7/1998 | Sato et al. .................. 370/218 |
| 5,781,529 A | | 7/1998 | Liang et al. ................ 370/218 |
| 5,835,481 A | * | 11/1998 | Akyol et al. ........... 370/395.53 |
| 5,936,936 A | * | 8/1999 | Alexander et al. .......... 370/216 |
| 5,949,753 A | | 9/1999 | Alexander, Jr. et al. .... 370/216 |
| 6,041,063 A | * | 3/2000 | Povlsen et al. ........ 370/395.53 |
| 6,226,297 B1 | * | 5/2001 | Alexander et al. .......... 370/401 |

FOREIGN PATENT DOCUMENTS

JP    10-107797    4/1998
JP    11-73401    3/1999
WO    WO 98/53575    11/1998

OTHER PUBLICATIONS

Alexander et al, Quick Guide to the IBM Multiprotocol Switched Services (MSS) Server Release 1.0, pp. 1–51, 1996.*
Cisco Networkers, Deploying LANE and MPOA, pp. 1–26, 1998.*
41451, "Server Redundancy Mechanisms in Asynchronous Transfer Mode Networks with Distributed Classical Internet Protocol Servers," IBM Corporation Research Disclosure, Oct. 1998, pp. 1365–1366.
"Fast Topology Update in Asynchronous Transfer Mode Networks," IBM Technical Disclosure Bulletin, vol. 38 No. 11, Nov. 1995, pp. 359–229.

(List continued on next page.)

Primary Examiner—Frank Duong
(74) Attorney, Agent, or Firm—Joscelyn G. Cockburn; Winstead Sechrest & Minick PC (57) ABSTRACT

To insure connection resiliency two LECs are defined in normal practice in which a lengthy and extensive recovery procedure is enforced in case of an ATM interface failure. In the present invention only one LEC is configured. This LEC is configured to be If the active ATM interface fails, the bridge is not notified of the failure as would normally happen. The LEC associates itself with the alternate ATM and rejoins the ELAN via the alternate ATM interface. The ELAN Join Procedure is one of the LAN Emulation protocols. After the ELAN has rejoined, the LEC automatically re-establishes the previously existing Data Direct VCCs (bi-directional point to point LAN Emulation connection established from one LEC to another) using its LE_ARP (LAN Emulation Address Resolution Protocol) cache entries.

14 Claims, 5 Drawing Sheets

OTHER PUBLICATIONS

"Redundant Asynchronous Transfer Mode Switching Module," IBM Technical Disclosure Bulletin, vol. 39 No. 04, Apr. 1996, pp. 227–229.

"ATM Internetworking," Cisco Systems, White Paper May 1995, pp. 1–60.

"Trillium ATM LAN Emulation White Paper," Trillium Digital Systems, Inc. 1989–1997, available via the Internet at http://www.trillium.com/whats–new/wp_atmlane.html, pp. 1–25.

"LANE," TechEncyclopedia, available via the Internet athttp://www.techweb.com/encyclopedia/defineterm?term=LANE, From Computer Desktop Encyclopedia, Copyright 1981–1999, pp. 1–2.

"Edge Device," TechEncyclopedia, available via the Internet at http:www.techweb.com/encyclopedia/defineterm?term=edgedevice, From Computer Desktop Encyclopedia, Copyright 1981–1999, pp. 1–3.

"SONET," TechEncyclopedia, available via the Internet athttp://www.techweb.com/encyclopedia/defineterm?term=SONET, From Computer Desktop Encyclopedia, Copyright 1981–1999, pp. 1–3.

"ATM.," TechEncyclopedia, available via the Internet at http:www.techweb.com/encyclopedia/defineterm?term=atm, From Computer Desktop Encyclopedia, Copyright 1981–1999, pp. 1–6.

* cited by examiner

METHOD AND SYSTEM FOR LEC RESILIENCY WITH FAST FAILOVER

TECHNICAL FIELD

The present invention relates in general to data processing systems, and in particular, to Asynchronous Transfer Mode (ATM) networks using Local Area Network (LAN) emulation and LAN Emulation Clients (LECs).

BACKGROUND INFORMATION

Asynchronous Transfer Mode (ATM), as a networking technology, has been gaining in popularity. It is widely perceived to be the underlying technology for high speed networks of the future. ATM's strengths are that it is highly scalable, in terms of access speeds (from 1.5 Mbps to as high as 1.2 Gbps and more), and in terms of application traffic (voice, video, and data). It also has its drawbacks, the primary one being its complexity and overheads, from the physical level (e.g., when Synchronous Optical Network (SONET) framing is used) to the ATM level (e.g., traffic and congestion control) to higher level functions (e.g., signaling).

As with any technology, a big challenge is to find applications where one can justify the cost of moving to the new technology. In many cases, network managers are hesitant to change to a new technology. If there is not enough demand for a new technology, equipment costs will remain high enough to prevent entry. With ATM there are many expected important applications; most of them are variations of high bandwidth and multimedia applications (e.g., scientific visualization, distance learning, video on demand, multimedia conferencing, etc.). These can be termed "native mode" applications as they will communicate directly over an ATM network. However, the widespread availability of such applications will not occur unless ATM networks become more ubiquitous (so end-to-end ATM connections can be established) and equipment costs decline sufficiently so that consumers can afford to deploy the important applications.

In the meantime, there are fewer glamorous applications using ATM today. These applications exist on today's networks that can utilize the high bandwidth inherent in ATM networks. For existing applications to work over ATM networks, an "emulation" layer has to be inserted which emulates the services of existing networks over ATM networks such that existing applications continue to operate as if they were using a higher speed version of old networks. The benefit of using ATM in this scenario is, existing applications receive high speed access and they may continue to interwork with existing networks.

To address the issue stated above, the ATM Forum (a committee to address ATM implementation issues) developed LAN Emulation which purports to run an emulation layer atop ATM hardware which makes the ATM network look like a conventional LAN, for example an Ethernet or a Token Ring network. With LAN Emulation, users can continue to run existing LAN applications while migrating their hardware to the higher bandwidth supported by ATM. LAN Emulation provides an easy migration path for network managers to move toward adopting ATM technology.

To define a LAN Emulation service over ATM, one has to consider the differences between ATM networks and other networks (e.g., IEEE 802.3 and 802.5 networks). Some of the major differences are listed below:

LANs offer connectionless service, so applications can communicate without a prior setup. ATM networks are connection oriented; before two end systems can communicate, a connection must be established via signaling (SVC) or via provisioning (PVC).

LANs are broadcast media, and ATM networks are point to point.

LANs use a flat 48 bit address space. ATM networks use larger more hierarchical addresses.

LAN boundaries, physical and administrative, are typically the same.

In contrast, ATM networks are point to point and as such arbitrary administrative domains may be defined independent of physical topologies.

Because of the above differences, the LAN Emulation layer must provide a connectionless data transfer, simple broadcast/multicast, address mapping of network addresses, and the ability to interconnect with existing LANs.

LAN Emulation is based on a client-server architecture, hence there are two types of components:

LAN Emulation Clients (LEC); and service components LAN Emulation Servers (LES), Broadcast and Unknown Server (BUS) and LAN Emulation Configuration Server (LECS).

Any ATM end system that wishes to use the services of LANs must have a LEC for a particular type of LAN. Such ATM end systems are of two types.

ATM Hosts: End systems that contain the applications that wish to communicate with other (LAN or ATM) end systems.

Edge Devices: These are bridges or routers that forward data from the emulated LAN (ELAN) to other LANs (emulated or otherwise).

An ELAN consisting entirely of ATM hosts, allows communication between applications on ATM attached devices only. An ELAN consisting entirely of "Edge Devices", allows LANs (e.g., "legacy" IEEE LANs) to be connected to each other across an ATM network. An ELAN that has a mix of ATM hosts and Edge Devices allows communication between ATM attached devices and legacy LAN stations.

A LEC communicates with other LECs to transfer data between communicating applications. To identify a destination for a data transfer, a LEC uses LAN emulation service components to translate a matching network (MAC) address to an ATM address.

Data communication using LAN Emulation to communicate on ATM networks is quite complex as is apparent in the above discussion. While the usefulness of ATM is apparent, the complexity of the network connections requires methods for ensuring reliability of connections and methods for "failover" (set up alternate communication paths in a soft fail mode) in the case a network connection fails. The failover performance determines the "resiliency" of the connection.

When network connections are established it may be possible to create two or more communication paths linking one segment to another. This creates a loop where two bridges on two LANs pass the same data from LAN to LAN forever. To prevent more than one communication path from occurring, transparent bridges use a spanning tree algorithm or protocol to determine a unique path between a source and a destination, avoiding bridge loops. In Edge Devices for enterprise ATM networks, LEC resiliency for example, is typically achieved by defining two LECs on different ATM adapters. These LECs both join the same ELAN and both are added as ports on the Edge Device bridge. A spanning tree protocol would block one of the two LEC ports to prevent a loop from occurring in the bridged network. If the ATM connection of the active LEC fails, the normal spanning tree procedures will activate the blocked LEC. In this case, the failover time of the spanning tree protocol can be quite long, typically on the order of forty-five seconds. This time is long enough to cause the failure of active sessions. There is a clear need for a way to provide improved LEC failover while keeping the response time low.

SUMMARY OF THE INVENTION

A LEC (any ATM end system that wants to use the services of IEEE 802.3 or 802.5 LANs) would have a connection typically defined through a bridge (Edge Device) to the device to which it is communicating. To insure connection resiliency, two LECs are defined in normal practice with a lengthy and extensive recovery procedure enforced in case of an ATM interface failure. In the present invention, only one LEC is configured. This LEC is configured to be associated with a given ATM interface with an alternate ATM interface also being defined. If the active ATM interface fails, the bridge is not notified of the failure as would normally happen. Bridge notification and the lengthy spanning tree topology change procedures are avoided. Instead, the LEC associates itself with the alternate ATM and rejoins the ELAN via the alternate ATM interface. Typically the ELAN Join Procedure can be completed in less than one second. The ELAN Join Procedure is one of the LAN Emulation protocols. Using this technique, failover may be performed with a sub-second response time. There is no need to inform the bridge that the failover had occurred since there was no change in the required bridge topology. After rejoining the ELAN, the LEC automatically establishes the previously existing Data Direct VCCs (bidirectional point to point LAN Emulation connection established from one LEC to another) using its LE_ARP (LAN Emulation Address Resolution Protocol) cache entries.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific network topologies, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Embodiments of the present invention add a new configuration parameter to the software used to implement a LEC with improved functionality for resiliency (LEC-R). LEC-R is used in this disclosure to refer to a LEC modified using embodiments of the present invention. This new parameter allows a LEC-R to specify an interface number for both a primary and a backup ATM interface. When configuring an ATM interface, a configuration command is entered that establishes that a LEC-R is now configured to be with the primary and the secondary ATM interface. This LEC-R establishes an ATM network connection using the primary ATM interface. To improve the resiliency of a LEC, embodiments of the present invention do not define two LECs as is normal practice. Instead only a LEC-R with the added configuration parameter and functionality is configured or used. This LEC-R is configured to be associated with the primary ATM interface and an alternate or secondary ATM interface. If a failure in the ATM interface occurs, the software controlling the ATM interface detects the failure of the interface because of loss of light in the fiber optic link or because of no response to a request. When the software detects a failure of the ATM interface, it notifies all users of that ATM interface and in particular it notifies the software controlling the LEC associated with the ATM interface. There is typically a function call in the software between the code controlling the ATM interface and the code controlling the LEC. The LEC-R with the added configuration parameter has additional code that allows it to associate itself with the secondary ATM interface once it is notified that an ATM interface failure has occurred.

The LEC-R would not notify the bridge device used in the ATM network in the event of a failure of the ATM interface as would normally be done. If the LEC-R had notified the bridge, the spanning tree topology change procedures (prior art method of establishing communication) would be invoked leading to the long failover time (length of time during which communication was disrupted). Instead the LEC, according to the present invention, associates itself with the alternate or secondary ATM interface and executes a call to rejoin the Emulated LAN (ELAN) via the secondary ATM interface. Typically this ELAN Join Procedure can be completed in less than one second. The ELAN Join Procedure is one of the LAN Emulation protocols defining how a LEC joins or becomes a member of an ELAN. Using embodiments of the present invention, failover may be performed with a sub-second response time and there is no need for a LEC-R to inform the bridge that a failure occurred since no change to the required bridge topology is necessary. The LEC, using embodiments of the present invention, stores data defining the first ATM network connection that existed during its association with the primary ATM interface and before the ATM interface failure occurred.

After the LEC-R has rejoined the ELAN, it has routines that allow it to again establish the first ATM network connection (applications that are communicating) over a new Data VCC or path. These routines and data saved defining the first ATM network connection enable the LEC-R to automatically establish the ATM network connection over the backup or secondary ATM interface. By using the saved data defining the first ATM network connection and using this information to re-establish the ATM network connection (a new path between communicating applications), communication may be restored fast enough so that the higher layer functions (e.g., transport protocols (TCP)), do not time out. The data communication that existed prior to the primary ATM interface failure may restart wiyhout extensive recovery time and without complete loss of communication. This results in an improved LEC resiliency.

Figure 1:
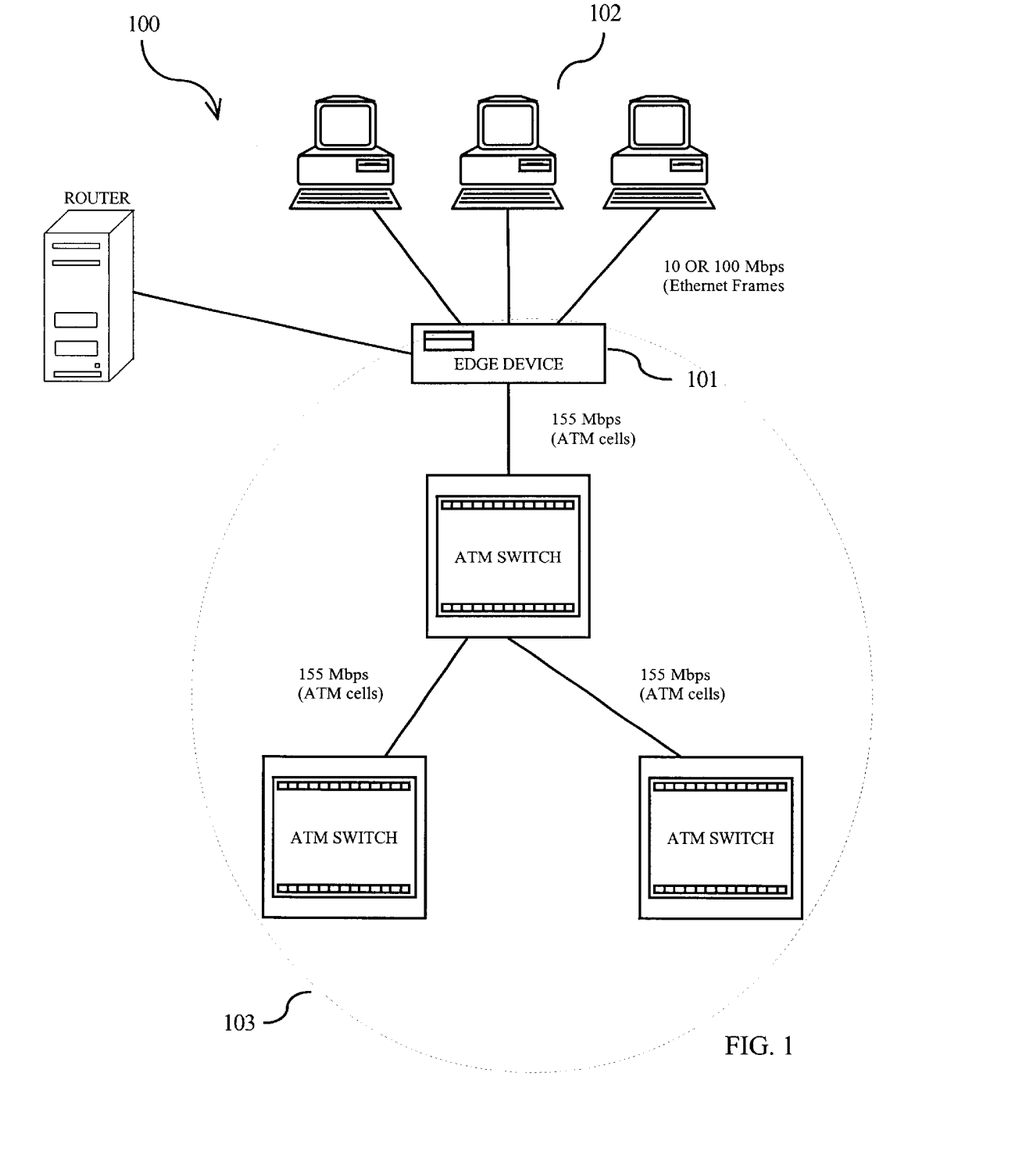
FIG. 1 is an illustration of a network incorporating ATM and other legacy LAN devices which may employ embodiments of the present invention.

FIG. 1 is an illustration of an ATM network 100 coupled to a LAN 102 through an Edge Device 101. The LEC, employing embodiments of the present invention, may reside in Edge Device 101. The dotted line encompasses ATM network 103 which includes ATM switches and Edge Device 101.

Figure 2:
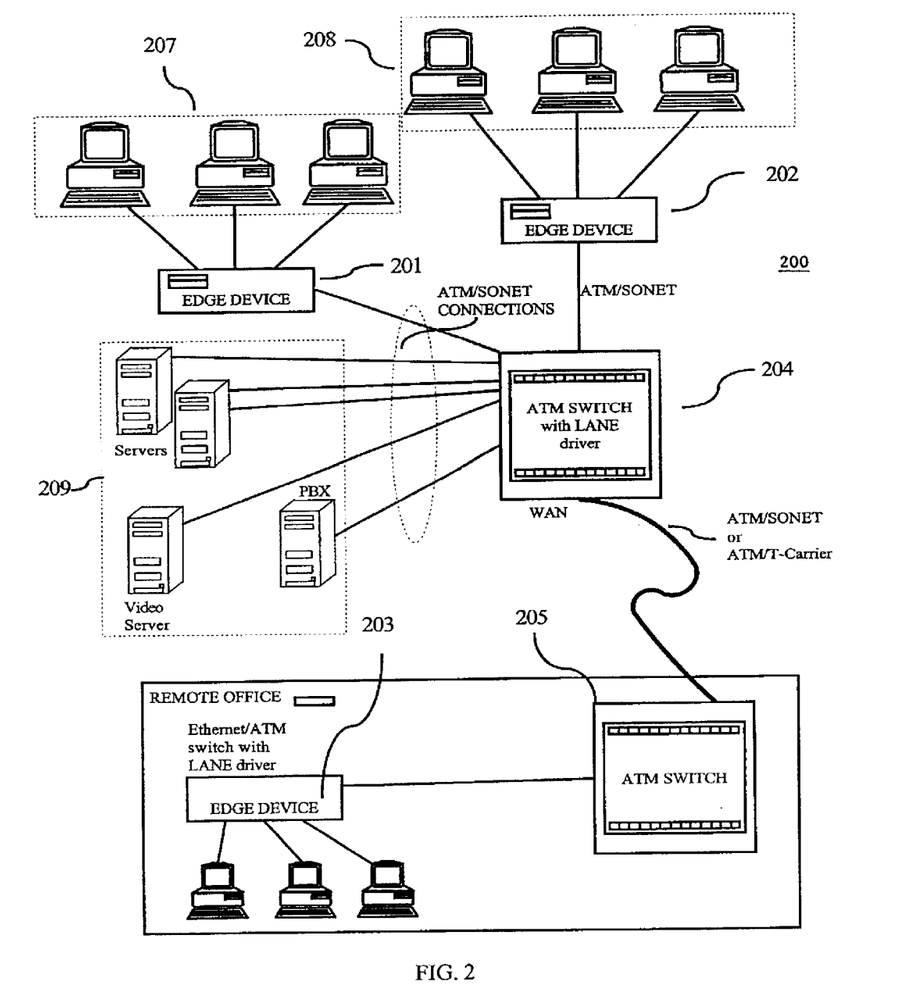
FIG. 2 is an illustration of another network incorporating ATM, SONET and other legacy LAN devices which may employ embodiments of the present invention.

FIG. 2 is an illustration of a more complicated ATM network 200 where a LEC-R may reside in Edge Devices 201, 202 or 203 and also in ATM Switch 204 or 205. Computers 207 and 208 may be on a LAN coupled to the ATM network through Edge Device 201 and 202 respectively. Servers and other systems 209 are shown coupled directly to switch 204 and would have ATM device hardware and software interfaces.

Figure 3:
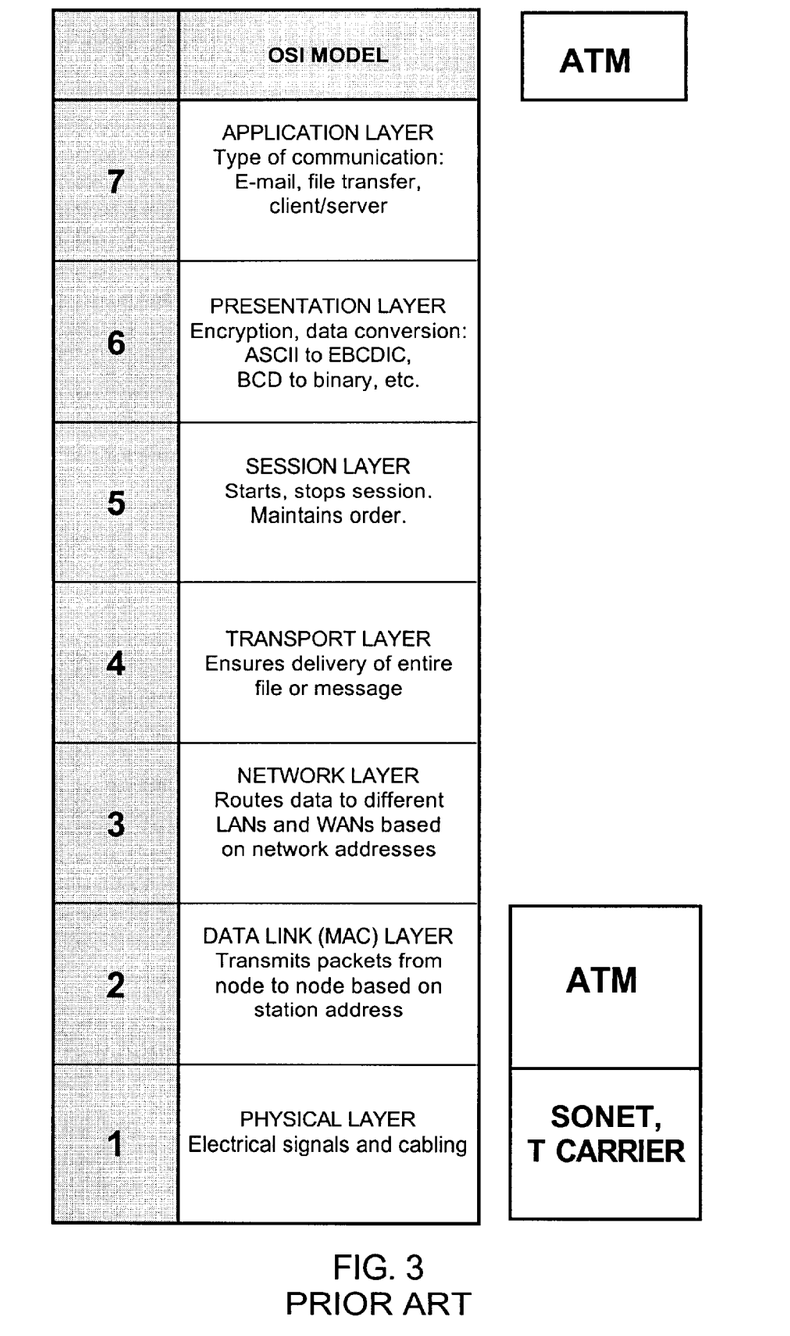
FIG. 3 is diagram illustrating hardware and software levels within the Open System Interconnect (OSI) model and the levels which ATM is a member.

FIG. 3 illustrates an Open System Interconnect (OSI) model describing the functional layers used in data communication systems including ATM and other network systems. FIG. 3 illustrates layers where control information is passed from layer to the other progressing from the physical layer where actual signals are used up to the software layer which contains an application program. Elements of the OSI model are used when ATM networks are used to communicate between applications.

Figure 4:
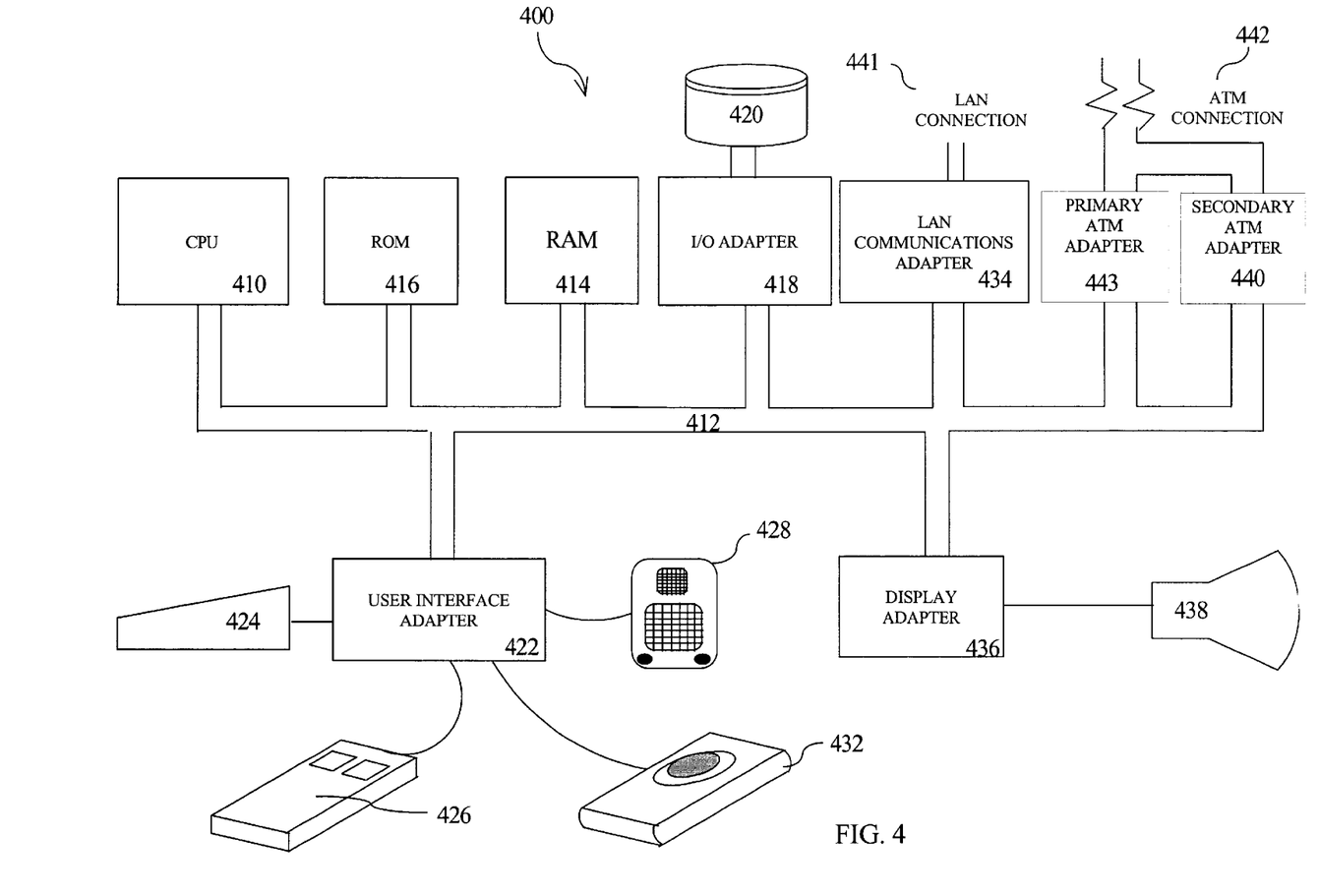
FIG. 4 is a data processing system usable with embodiments of the present invention.

Referring to FIG. 4, an example is shown of a data processing system 400 which may be used as an Edge Device and operate with embodiments of the present invention. The system has a central processing unit (CPU) 410, which is coupled to various other components by system bus 412. Read-only memory ("ROM") 416 is coupled to the system bus 412 and includes a basic input/output system ("BIOS") that controls certain basic functions of the data processing system 400. Random access memory ("RAM") 414, I/O adapter 418, and communications adapter 434 are also coupled to the system bus 412. I/O adapter 418 may be a small computer system interface ("SCSI") adapter that communicates with a disk storage device 420. Communications adapter 434 interconnects bus 412 with an outside network enabling the data processing system to communicate with other such systems. Input/Output devices are also connected to system bus 412 via user interface adapter 422 and display adapter 436. Keyboard 424, track ball 432, mouse 426, and speaker 428 are all interconnected to bus 412 via user interface adapter 422. Display monitor 438 is connected to system bus 412 by display adapter 436. In this manner, a user is capable of inputting to the system through the keyboard 424, trackball 432, or mouse 426, and receiving output from the system via speaker 428, and display 438. LAN communication adapter 434 may be coupled to a LAN 441 and a primary ATM adapter 443 and a secondary ATM adapter 440 are coupled to an ATM network 442 for high speed data communication. The data processing system 400 may operate as an Edge Device and may incorporate a LECs which employs embodiments of the present invention. Applications running on the data processing system illustrated by FIG. 4 may communicate with other applications via the ATM network connection 442 or via LAN connection 441 coupled to LAN communications adapter 434.

Figure 5:
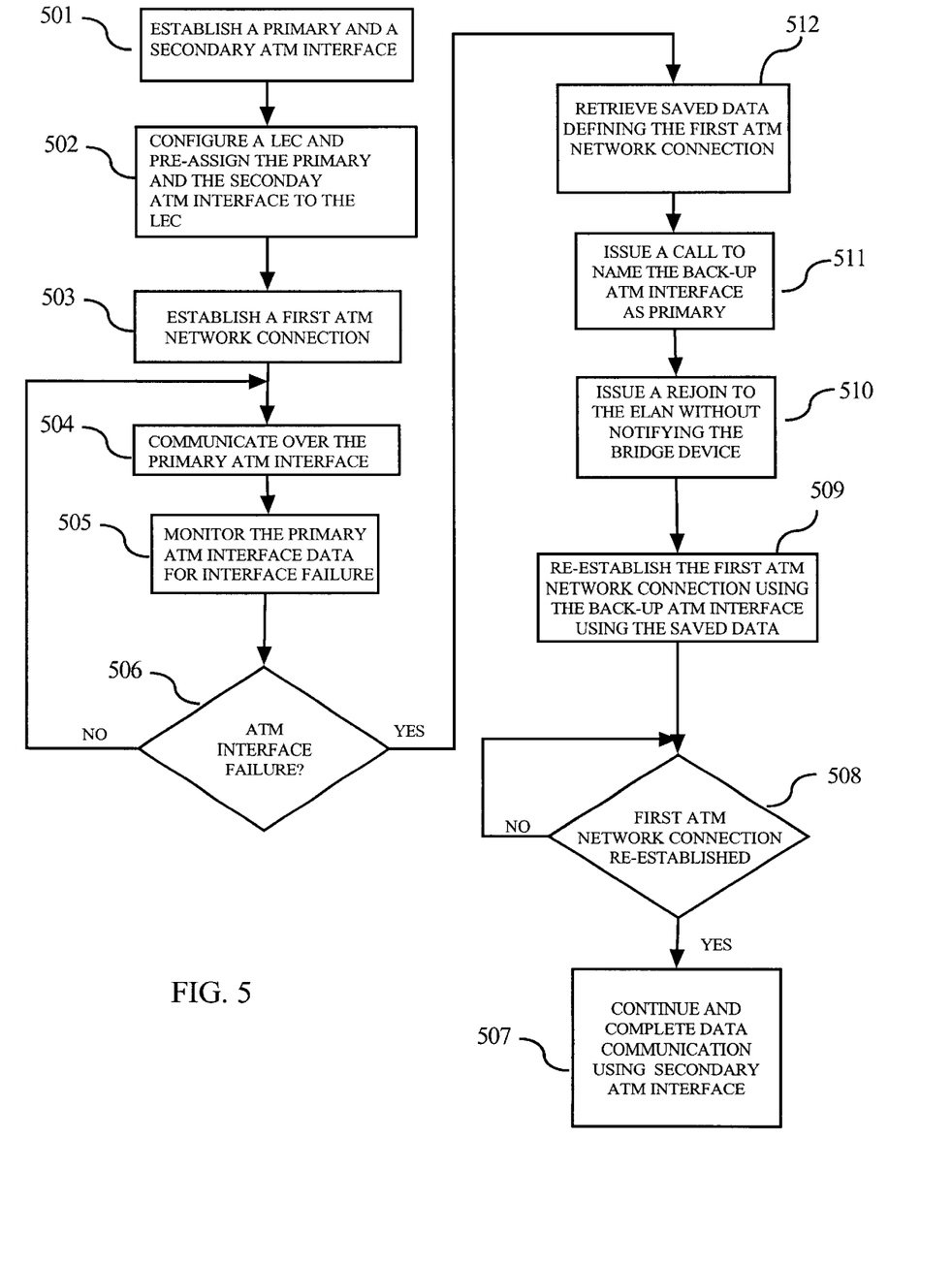
FIG. 5 shows a flowchart of the process according to teachings of the present invention.

FIG. 5 is a flow diagram of method steps in embodiments of the present invention. In step 501, a primary and a secondary ATM interfaces are established. In step 502 a LEC is configured and the primary and secondary ATM interface are assigned to the LEC. An ATM connection is established with the primary ATM interface in step 503. Communication is initiated over the primary ATM interface in step 504 and interface failures are monitored in step 505. No failure in the interface continues communication in a loop to step 504. If the ATM interface fails in step 506 a branch is made to step 512 where data defining the previous ATM network connection is retrieved. In step 511 the secondary ATM interface Is designated as the communication interface. The ELAN rejoins without notifying the bridge device in step 510. The ATM network connection is established using the secondary ATM interface in step 509. If the ATM network connection is established in step 508 the data communication resumes and completes using the secondary ATM interface in step 507.

Although the present invention and its advantages have been described in detail, it should be understood that various changes, substitutions and alterations can be made herein without departing from the spirit and scope of the invention as defined by the appended claims.

What is claimed is:

1. A LAN Emulation Client (LEC) resiliency method comprising:

providing a first and a second Asynchronous Transfer Mode (ATM) interfaces said first and second ATM interfaces being operable for use by a single LEC for controlling data communication;

establishing an ATM network connection and using said first ATM interface for data communication over said ATM network connection;

associating said single LEC with said second ATM interface if said first ATM interface fails using a first resiliency configuration parameter (RCP), said first RCP operable to specify said first or said second ATM interface as an active LEC interface to said ATM network; and invoking, by said LEC, a join procedure, said join procedure operable to join said LEC to an Emulated Local Area Network (ELAN) coupled to said ATM network using said second ATM interface in response to a failure of said first ATM interface.

2. The LEC resiliency method of claim 1, wherein said first ATM network connection is re-established by said LEC after said LEC has rejoined said ELAN using said second ATM interface, said LEC using saved data defining said first ATM network connection.

3. The LEC resiliency method of claim 1, wherein said first RCP is an added parameter within said LEC.

4. A system to emulate Local Area Network (LAN) over ATM Network comprising:

a first primary Asynchronous Transfer Mode (ATM) interface circuit;

a second secondary ATM interface circuit; and a controller executing a LAN emulation client (LEC) program that uses the first Primary ATM interface circuit to communicate over the ATM network and in response to a failure of the first primary ATM interface circuit said LEC program switches communication from the first primary ATM interface circuit to said second secondary ATM interface circuit.

5. The system of claim 4 further including an ATM connection coupling the first primary Asynchronous Transfer Mode interface circuit and the second secondary Asynchronous Transfer Mode interface circuit to said ATM network.

6. The system of claim 4 or 5 wherein the controller includes a CPU.

7. The system of claim 4 further including a storage unit operable to store data defining an ATM network connection established by said LEC when said LEC was using said first primary Asynchronous Transfer Mode interface circuit to communicate.

8. The system of claim 7 wherein said LEC uses the stored data to define the ATM network connection when communication switches from the first primary Asynchronous Transfer Mode circuit to the second secondary Asynchronous Transfer Mode circuit.

9. A method comprising:
   providing a first primary Asynchronous Transfer Mode circuit;
   providing a second secondary Asynchronous Transfer Mode circuit;
   providing a LAN Emulation Client (LEC) program to be executed on a CPU;
   configuring the LEC program to associate with the first primary Asynchronous Transfer Mode circuit and the second secondary Asynchronous Transfer Mode circuit establishing, with said LEC program, communication over the first primary Asynchronous Transfer Mode circuit;
   monitoring said first primary Asynchronous Transfer Mode circuit to detect interface failure; and
   said LEC program switching communication from the first primary Asynchronous Transfer Mode circuit to the second secondary Asynchronous Transfer Mode circuit only if interface failure is detected.

10. The method of claim 9 further including storing in a memory data defining an ATM network connection established by said LEC program when said LEC program was using said first primary Asynchronous Transfer Mode circuit to communicate.

11. The method of claim 10 further including using said stored data to define the ATM network connection when the second secondary Asynchronous Transfer Mode circuit is used to communicate.

12. A program product comprising:
   a medium in which computer program is recorded, said computer program including
   a first set of instructions to which a primary ATM interface and a secondary ATM interface is being defined as entities through which communication is to be made;
   a second set of instructions to establish communication over said primary interface;
   a third set of instructions to monitor the primary interface to detect interface failure; and
   a fourth set of instructions responsive to interface failure to switch communication from the primary ATM interface to the secondary ATM interface only if interface failure is detected.

13. The program product of claim 12 further including a fifth set of instructions that cause data defining an ATM network connection to be stored when said primary interface was being used to transmit.

14. The program product of claim 13 further including a sixth set of instructions which used the stored data to define the ATM network connection when the secondary interface is being used to transmit.

* * * * *